Jan. 14, 1964  W. E. KERR ETAL  3,117,520
SELF-TIGHTENING ATTACHMENT ARRANGEMENT
Filed July 2, 1959  2 Sheets-Sheet 1
Fig. 1
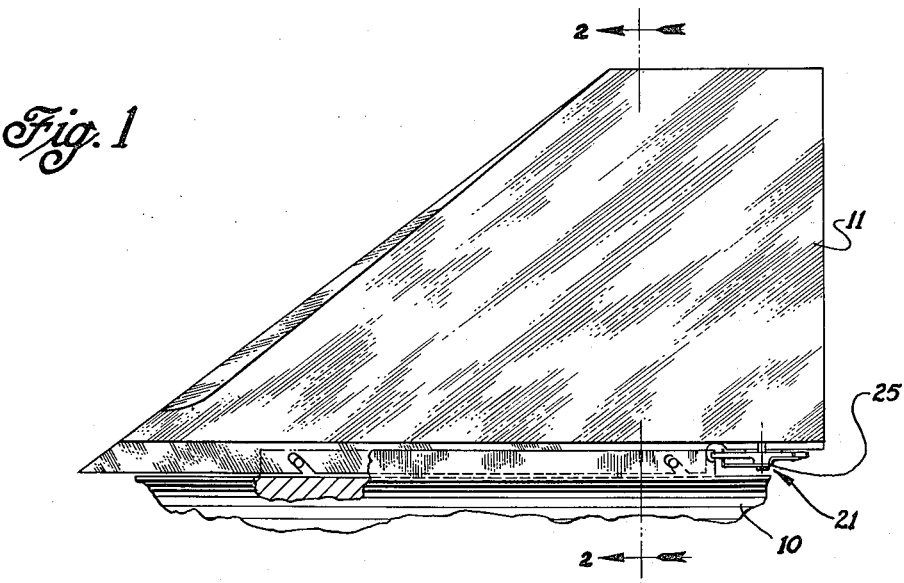
Fig. 2
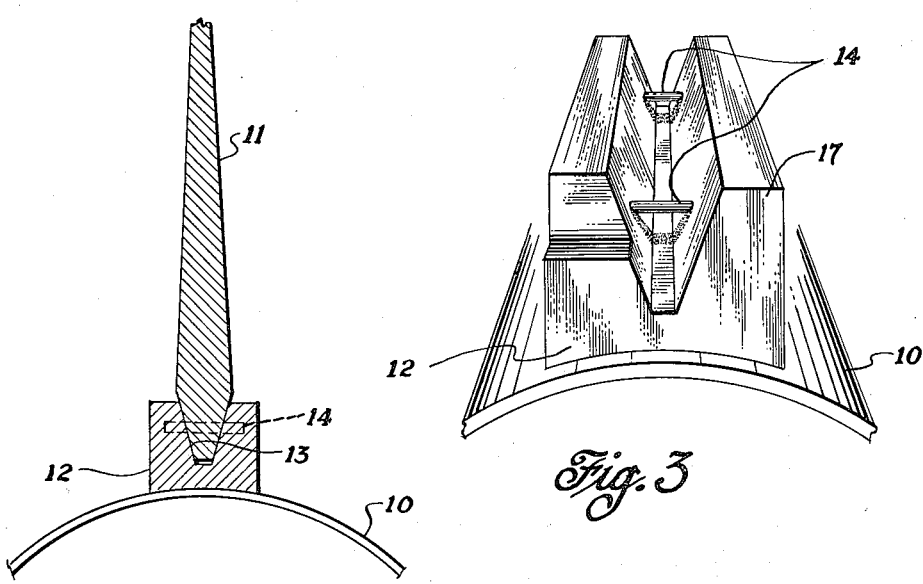
Fig. 3
INVENTORS.
ROBERT R. HARTER
WAYNE E. KERR
BY
Julian C. Renfro
ATTORNEY.

Jan. 14, 1964 W. E. KERR ETAL 3,117,520
SELF-TIGHTENING ATTACHMENT ARRANGEMENT
Filed July 2, 1959 2 Sheets—Sheet 2

INVENTORS.
ROBERT R. HARTER
WAYNE E. KERR
BY
Julian C. Renfro
ATTORNEY.

United States Patent Office 3,117,520
Patented Jan. 14, 1964

3,117,520
SELF-TIGHTENING ATTACHMENT
ARRANGEMENT
Wayne E. Kerr, Winter Park, and Robert R. Harter, Orlando, Fla., assignors to Martin-Marietta Corporation, a corporation of Maryland
Filed July 2, 1959, Ser. No. 824,706
4 Claims. (Cl. 102—50)

This invention relates to an arrangement for attaching two members together, and more particularly to the releasable attachment of a fitting such as a fin, wing, or tail surface to a vehicle such as a missile.

In the past, many arrangements have been provided and actually used in which fixed surfaces were secured to airborne missiles, underwater devices such as torpedoes, or the like. However, in each known instance the securing of the fins or surfaces to the missile was a laborious, time consuming task involving the use of many securing devices such as bolts, rivets and pins. Not only was this inconvenient from the standpoint of the time required for attaching and removing the surfaces, but also in many instances a fin and missile had to be mated together to exacting tolerances. Then if that fin became damaged, it was difficult if not impossible to successfully replace it in the field with another similar fin. Furthermore, the in-flight strength of the prior art devices for joining fins to missiles was little more than a direct function of the shear strength of the rivets, bolts, or pins used, and under flight loads and vibration, often tended to become loosened.

According to the present invention, we have provided a fastening arrangement for securing two members together, by the use of which a fin or the like can be rapidly attached to or removed from a missile without the use of tools and in a simple and efficient manner. If reasonable machine shop tolerances are followed in the manufacture of the components constituting this inventon, any fin manufactured for missiles of a certain type may be secured at any proper location on any of the missiles for which it is designed without any elaborate measures being taken to bring about proper fit, and with no requirement for installation tools.

As an additional facet of this invention, the arrangement is such that the loads such as wind loads upon the fin or surface tend to drive it in such a direction as to actually increase the force by which it is held to the missile, this action being obtained as a result of the use of a tapered attachment fitting advantageously employing a retention arrangement to secure the surface or fin to the missile body. The present attachment arrangement is contoured in the radially inward direction to create a wedge and wedge-receiving arrangement and because of the retention arrangement, the wedging action is caused to be quite large, and to increase in tightness as the fin would tend to be moved rearwardly by the flow of air or water thereover.

A fitting or fastening arrangement according to a preferred embodiment of this invention may comprise first and second members, with a portion of the first member having tapered side walls to form a tapered attachment fitting defining a generally wedge-shaped portion, and the second member having a complementary fitting for receiving the attachment fitting. The complementary fitting may have tapered side walls defining a groove into which the attachment fitting may be tightly received, and a retention arrangement is provided for holding the fittings tightly together and adapted to cause the first member to be moved in a wedge-tightening direction relative to the second member.

The retention arrangement may take the form of a pin and angled slot arrangement whereby if the fin tends to be moved rearwardly, the angularity of the slot forces said fittings more tightly together so as to increase the wedging action of the tapered surfaces. Releasable means may be employed to prevent undesired removal of fins from the missile, this means being preferably of such a nature as to be biased to maintain at all times a force on said fin in a wedge tightening direction with respect to said missile. This means may be in the nature of a cam-shaped locking device that is spring biased to constantly engage an offset shoulder on the wedge-receiving member, which causes a force in a wedge-tightening direction on the fin, so that the tightness of the juncture actually increases during normal in-flight vibrations.

These and other features and advantages of this invention will be apparent from the appended drawings in which:

FIGURE 1 illustrates a side elevation view of a typical missile fin, with portions broken away to reveal details of the novel removable attachment arrangement according to this invention;

FIGURE 2 is a cross section view taken along line 2—2 of FIGURE 1, revealing the tightly fitting manner in which the tapered attachment fitting is received by the complementary fitting;

FIGURE 3 is a perspective view of the fixed complementary attachment fitting, looking forwardly, and revealing the tapered side walls defining a groove into which the attachment fitting of the fin can be tightly received;

Figure 4:
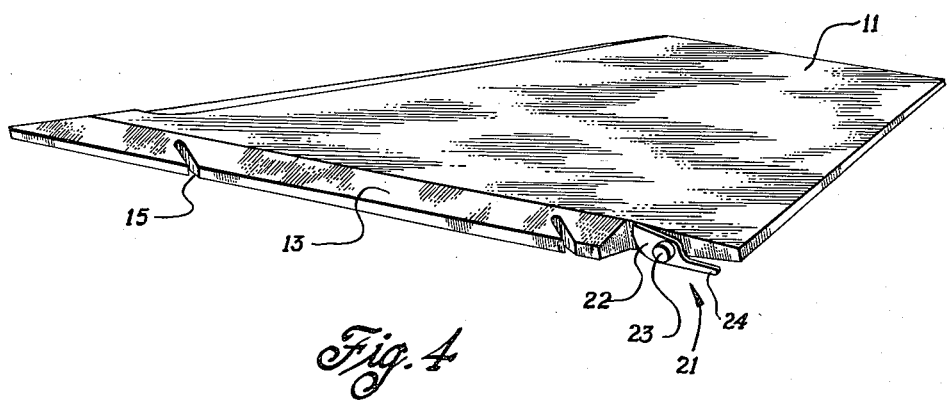
FIGURE 4 is a perspective view of a fin adapted according to the present invention, illustrating details of the tapered attachment fitting of the fin and the cam lock.

A preferred arrangement according to this invention for removably attaching a movable member such as a fin or wing to a fixed member such as on an aircraft or watercraft is shown in FIGURE 1 of the drawing, wherein a portion of craft or missile 10 is illustrated with fin 11 attached thereto. A portion of each fin has tapered side walls to form a tapered attachment fitting 13 of generally wedge-shaped configuration, whereas the missile 10 is equipped with a plurality of complementary fittings 12 each having tapered side walls defining a groove into which the tapered attachment fitting can be tightly received. As will be understood, there are as many fittings 12 on the missile as there are fins 11. FIGURES 2 and 3 reveal the details of the tapered side walls of fitting 12, into which the tapered wedge fitting 13 (FIGURE 4) on fin 11 is arranged to interfit.

A retaining arrangement for securing members 12 and 13 together is employed according to this invention, which may involve the use of at least two spaced pins 14 advantageously provided in grooved attachment fitting 12 to prevent undesired separation of fin 11 therefrom. The retaining action is brought about by at least two inclined slots 15 provided in complementary fitting 13, so placed as to engage pins 14 when the fin is to be secured to the missile. An exemplary relationship of pins and slots is best seen in FIGURE 1, wherein the placement of the entrance to slots 15 is revealed to agree with the placement of pins 14 so that as the fin 11 is inserted to the right (rearwardly) and downwardly as shown in FIGURE 1, this pin and slot arrangement would serve to prevent undesired dislodgment or removal of the fin. At the same time that the fin is moving so as to cause the pins 14 to travel inclined slots 15, the entire complementary fitting 13 is becoming more tightly wedged into fitting 12, as best seen in FIGURE 2, so as to tightly and positively secure the fin on the missile in the desired location.

As best seen in FIGURE 3, the grooved attachment fitting 12 is uncomplicated in its construction, with the two sides being sloped or contoured at substantially equal angles with respect to the perpendicular. As seen in FIGURE 4, fitting 13 is contoured to fit closely between the sides of fitting 12, and because of the aforementioned pin and slot arrangement, the effect of in-flight skin friction over the fin actually tends to cause it to fit more tightly on the missile, because the further aft the fin is moved, the more tightly the fitting 13 is wedged into the tapered groove formed in member 12. At the time of launch, the zero inertia of the fins with respect to the rest of the missile often causes them to seat into their respective fittings more tightly than at the time of the original installation.

According to this invention, a so-called "cam lock" device 21, is provided to prevent undesired separation of the fin from the attachment fitting 12. Cam lock 21 principally consists of a rotatable cam 22 pivoted upon pin 23, cam 22 being movable such as by handle 24 between the locking position shown in FIGURE 5, and a releasing position in which it is turned substantially 90° away from the position shown in this figure. As will be observed in FIGURE 3, one rear corner of fitting 12 has been removed, thus allowing side or shoulder 17 to extend rearwardly to a greater extent, so as to be engaged by the contoured portion of cam 22 when locking the fin to the missile.

Figure 5:
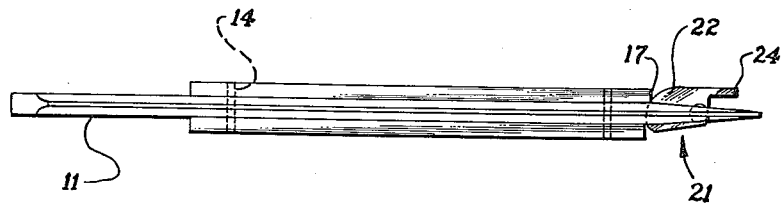
FIGURE 5 is a view from the outer edge of the fin revealing the manner in which the cam lock functions to prevent undesired loosening of the fin from the fixed fitting on the missile.

When fitting 13 of fin 11 is being inserted in fitting 12, handle 24 is held in a position approximately 90° away from the position of FIGURE 5 so cam portion 22 does not interfere. Then after the initial installation of complementary fitting 13 into grooved fitting 12, the handle is released, allowing spring 25 (only partially visible) to bias it in the direction so as to bring rounded portion of cam 22 into engagement with side 17 defining the rearmost portion of fitting 12. (As seen in FIGURE 5, this direction is clockwise.) A tighter fit can of course now be achieved either by physically forcing the fin downwardly and rearwardly or alternatively by forcing handle 24 in the direction so as to bring the larger radius portions of cam 22 into forced contact with shoulder 17 of fitting 12, thereby to effectively prevent motion of the fin in the removal direction.

As should be apparent, the stress and vibration encountered in launch and flight regimes of the missile will tend to increase rather than to decrease the tightness of the fit. That is because any subsequent rearward and downward motion of fin 12 will result in increasing the distance between shoulder 17 and pin 23, and this increase in distance is immediately followed by ensuing rotation of cam 22 (under the influence of spring 25) to take up slack and thereby hold the fin 12 in this new position. Because shoulder 17 is offset with respect to pin 23, any motion of the fin in the removal direction tends to cause cam 22 to bear tightly against shoulder 17, and since the point of contact is offset with respect to the pivot point 23 of cam 22, it actually tends to bias cam 22 into the locking direction rather than the release direction. Manual rotation of cam lock 21 in the counterclockwise direction by the use of handle 24 enables the fin to be released for removal when such is desired.

The present invention makes it convenient for a missile to be shipped or transported with the fins or wings thereof in stowed position, even though it may be necessary to fire the missile with but a few moments notice. This is so because as before mentioned, no special tools are needed for the installation of the fins on the missile. Whereas in earlier designs it was necessary to laboriously bolt or otherwise fasten a fin or wing to the missile using wrenches or other tools, according to this invention it is only necessary to move the cam lock to one side and then drop the complementary fitting 13 into attachment fitting 12 of the missile and then release the cam lock to cause the fin to lock in place against dislodgment.

As will be understood, many modifications of the preferred embodiment shown may be made without departing from the spirit of this invention. The retaining arrangement can be varied, and the releasable locking means can be located forward or aft of fin. It is therefore to be understood that within the scope of the appended claims the invention may be practiced otherwise than as specifically described.

What we claim is:

1. An arrangement for removably attaching fins or the like to a missile, comprising a plurality of fins each having thereon a portion with tapered side walls to form a tapered attachment fitting of generally wedge-shaped configuration, said sidewalls being tapered symmetrically with respect to the plane of the respective fin and a plurality of complementary fittings each arranged to receive one of said tapered attachment fittings, said complementary fittings being adapted to be secured at spaced positions on a missile, and each having tapered side walls defining a groove of substantially constant cross section into which one of said tapered attachment fittings can be tightly received, an inclined slot and pin arrangement for forcing each pair of fittings tightly together, at least two inclined slots being located in spaced positions on one fitting of each pair of said fittings, and at least two similarly spaced pins being located on the other fitting of each pair of said fittings, said inclined slots being adapted to receive respective pins to cause the respective tapered attachment fitting to be moved in a wedge-tightening direction relative to said missile during insertion of each fin, and releasable locking means serving continuously to bias each pair of said fittings in a wedge-tightening direction.

2. The arrangement defined in claim 1 in which said releasable locking means is a rotatable cam mounted upon one fitting of each pair of fittings, said cam being spring biased and having an active surface offset with respect to an abutment surface on the other of said fittings of each pair, said cam engaging said abutment surface so that motion between said fittings tending to occur in the fin-removal direction will tend to rotate said cam in a tightening direction, whereby the juncture between said fittings will be tightened by motion tending to occur therebetween.

3. A self-tightening arrangement for removably attaching a fin or the like to a missile, comprising in combination:
   (a) a fin having a tapered attachment fitting extending substantially along the length of one edge of the fin, said attachment fitting having surfaces disposed generally in a modified wedge-shaped configuration, said surfaces being inclined generally symmetrically with respect to the plane of the fin,
   (b) a complementary fitting on said missile arranged to receive said tapered attachment fitting, said complementary fitting having tapered sidewalls defining a groove of substantially constant cross-section into which said tapered attachment fitting can be tightly received,
   (c) an inclined slot and pin arrangement for forcing said fittings tightly together,
   (d) said inclined slot and pin arrangement comprising at least two inclined slots disposed in spaced locations on one of said fittings, and as many pins disposed in similarly spaced relation on the other of said fittings,
   (e) said inclined slots receiving the respective pins when said fittings have been preliminarily assembled, and functioning as said pins move along said slots to cause said tapered attachment fitting to move in a wedge-tightening direction into said complementary fitting, and
   (f) releasable locking means for preventing undesired delodgment of said pins from said slots, said locking means relatively biasing said fittings in such direction that ensuing movement of said pins in said slots causes increased tightness of fit between said fittings.

4. The self-tightening fin arrangement as defined in claim 3 in which said releasable locking means comprises a spring biased cam arrangement mounted upon one of said fittings, said cam arrangement including a rotatable cam having an active cam surface bearing against the other of said fittings, said cam tending to rotate under the influence of said spring during the presence of motion between said fittings so as to increase the tightness of the fit between said fittings.

References Cited in the file of this patent

UNITED STATES PATENTS

| | | |
|---|---|---|
| 64,160 | Smith | Apr. 23, 1867 |
| 843,456 | Higbee et al. | Feb. 5, 1907 |
| 2,544,830 | Grill et al. | Mar. 13, 1951 |
| 2,842,058 | Kuller et al. | July 8, 1958 |